United States Patent [19]

Mundelius et al.

[11] Patent Number: 4,594,038
[45] Date of Patent: Jun. 10, 1986

[54] SECONDARY OPERATIONS MACHINE TOOL

[76] Inventors: Kevin G. Mundelius; Christian H. Buddenbaum, both of 3011 W. Rte. 120, McHenry, Ill. 60050

[21] Appl. No.: 673,182

[22] Filed: Nov. 19, 1984

[51] Int. Cl.⁴ .................. B23C 3/00; B23C 3/30
[52] U.S. Cl. ...................... 409/205; 29/560; 144/1 R; 144/1 B; 144/3 R; 409/218
[58] Field of Search .............. 408/20; 409/205, 225, 409/240, 218, 138; 29/560; 144/1 R, 1 B, 1 C, 3 R, 38, 39, 30, 136 R

[56] References Cited

U.S. PATENT DOCUMENTS

| | | | |
|---|---|---|---|
| 521,185 | 6/1894 | Seymour | 144/1 B |
| 895,287 | 8/1908 | McDonald | 144/1 B |
| 1,621,999 | 3/1927 | Pierce | 144/1 B |
| 2,071,201 | 2/1937 | Frech | 144/1 B |
| 2,656,861 | 10/1953 | Verret | 144/1 B |

FOREIGN PATENT DOCUMENTS 518285  3/1955  Italy ..................... 144/1 R

Primary Examiner—James M. Meister
Attorney, Agent, or Firm—Russell L. Johnson

[57] ABSTRACT

A motor driven apparatus for performing secondary or auxiliary functions such as cutting slots, chamfering, milling flats, removing protrusions and the like. The apparatus comprises a motor having a multiplicity of cutting tools mounted to the shaft, a box like housing covering the shaft and tools, guides incorporated into the construction of the top and three sides of the housing, and the guides serve to position and guide work pieces into the cutters to perform common auxiliary or secondary operations on work pieces.

4 Claims, 6 Drawing Figures

SECONDARY OPERATIONS MACHINE TOOL

BACKGROUND OF THE INVENTION

In machine shops there is often a need to perform secondary or auxiliary machining functions. Such functions as chamfering, slotting, milling of flats and removing protrusions and the like may be performed by most production machines. However, it is often time consuming and expensive to set up and run production machines to perform these secondary or auxiliary operations.

It is not uncommon practice to set up a machine to perform these secondary operations and employ an operator to do little else but perform these auxiliary functions.

OBJECTS

It is an object of this invention to provide a motor driven apparatus which will serve to perform a variety of secondary or auxiliary machining functions.

It is further an object of this invention to provide the apparatus as described above wherein the motor and apparatus assembly is light weight and portable.

It is further an object of this invention to provide the apparatus described above wherein the apparatus is configured so as to drive more than one cutting tool and to be set up to perform a multiplicity of different auxiliary machining operations at a multiplicity of work positioning and feeding locations on the apparatus.

DISCUSSION OF PRIOR ART

The prior art may be divided into two categories; special tools and guides to be attached to production machinery to facilitate the performing of auxiliary machining functions, and fixed location machines dedicated to the performing of special machining tasks.

The applicant knows of no portable motor driven apparatus which may be set up to perform a number of auxiliary machining operations using a number of cutters and tool positioning and guiding means to provide the apparatus with the capability of performing a number of auxiliary machining operations as needed.

BRIEF DESCRIPTION OF THE INVENTION

The invention is a portable apparatus for performing auxiliary machining operations comprising a base, an electric motor mounted on the base, an arbor projecting over the base mounted to the shaft of the motor, circular milling cutters mounted to the arbor, an ID or OD chamfering tool mounted to the end of the arbor, a housing having adjustable guides and stops located at an end, top and two lateral sides of the housing. The top guide being a V-guide for positioning pieces relative to the milling cutter for straight line chamfering, the end guide being a guide for ID and/or OD chamfering of round or tubular work pieces, the two side guides being employable for slotting, flat milling, protrusion removal and the like.

DETAILED DESCRIPTION OF THE INVENTION

Figure 1:
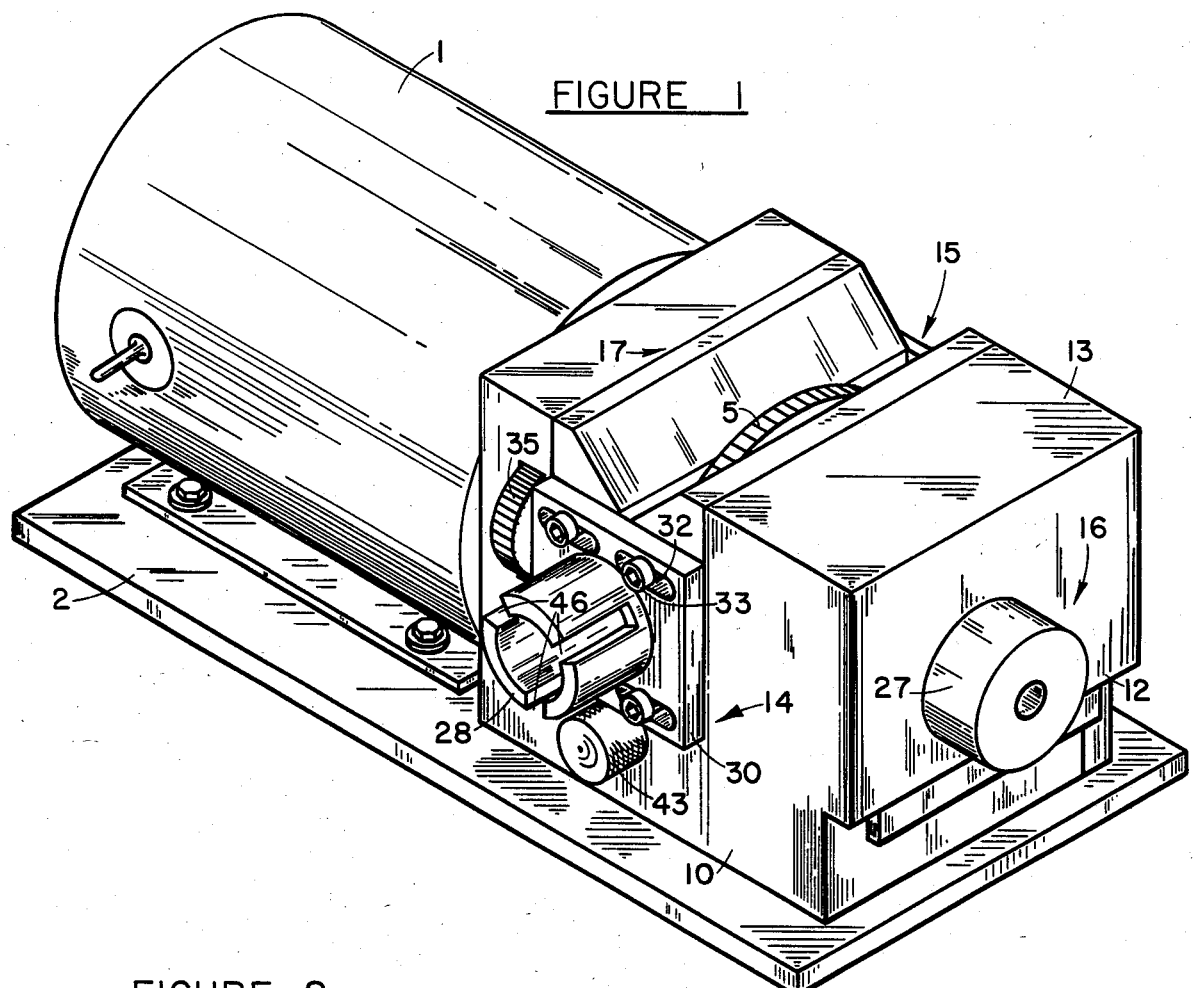
FIG. 1 is a pictorial view of the apparatus of this invention.

In the figures like numbers refer to like objects.

The invention is characterized by having a motor 1 mounted on a base 2, and having motor shaft 3 projecting over base 2. Attached to motor shaft 3 is arbor 4 having mounted to its midsection spaced apart circular milling cutters, first milling cutter 5 and second milling cutter 6, and having secured to its end ID-OD chamfering tool 7. Arbor 4 is supported at its midlength by support plate 8 which is mounted on guide plate 9 which is supported above and parallel to base plate 2 by first side plate 10 and second side plate 11.

An external housing, comprising side plates 10 and 11, end plate 12, and top 13 covers arbor 4. Incorporated with plates 10, 11, 12, and top 13 are first side guide 14, second side guide 15, end guide 16, and top guide 17, respectively. Guides 14, 15, 16 and 17 may be set up to perform a given function or set of functions to serve the needs of the user.

The above described apparatus is portable and incorporates its own motor. It has four guide positions by means of which the apparatus may be set up to perform four or more commonly needed auxiliary operations according to the needs of the user. In general the guide is sized according to the work piece, and positioned relative to the cutting tool. Adjustable stops are positioned as needed. The work piece is then inserted through the housing by way of the guides and brought into contact with the cutting tool which performs the desired operation.

The apparatus of this invention is described in a representative configuration below. It should be understood that the two side plates, the end plate and the top may be individually replaced so that a variety of guides and/or guide mounts may be incorporated into the housing as required. While the following disclosure is such that one skilled in the art could make and use the invention for its intended purposes without undue experimentation, the range of utility of the apparatus is to some extent dependent upon the imagination and skill of the user. An attempt to deal exhaustively with the possible combinations of guides, mounts, adjustments, and work piece holders would cause the specifications to become prolix and greatly multiply the claims. Therefore the following descriptions should be read to include obvious combinations and equivalents thereto which would become apparent to one skilled in the art.

Figure 3:
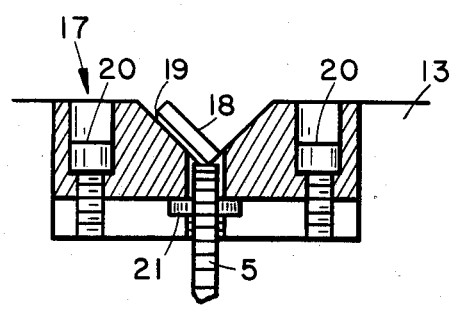
FIG. 3 is a sectional view of the straight line chamfering guide of this invention.

Top guide 17 is a 90° V-guide which is positioned over milling cutter 5 as shown in FIGS. 1 and 3. A straight line work piece 18 may be passed through guide 17 and thereby have a straight line chamfer 19 cut on piece 18 by cutter 5. The size of chamfer 19 is adjusted by raising or lowering guide 17 relative to cutter 5 which is achieved by loosening bolts 20, raising or lowering adjustment screw 21 and retightening bolts 20.

Figure 2:
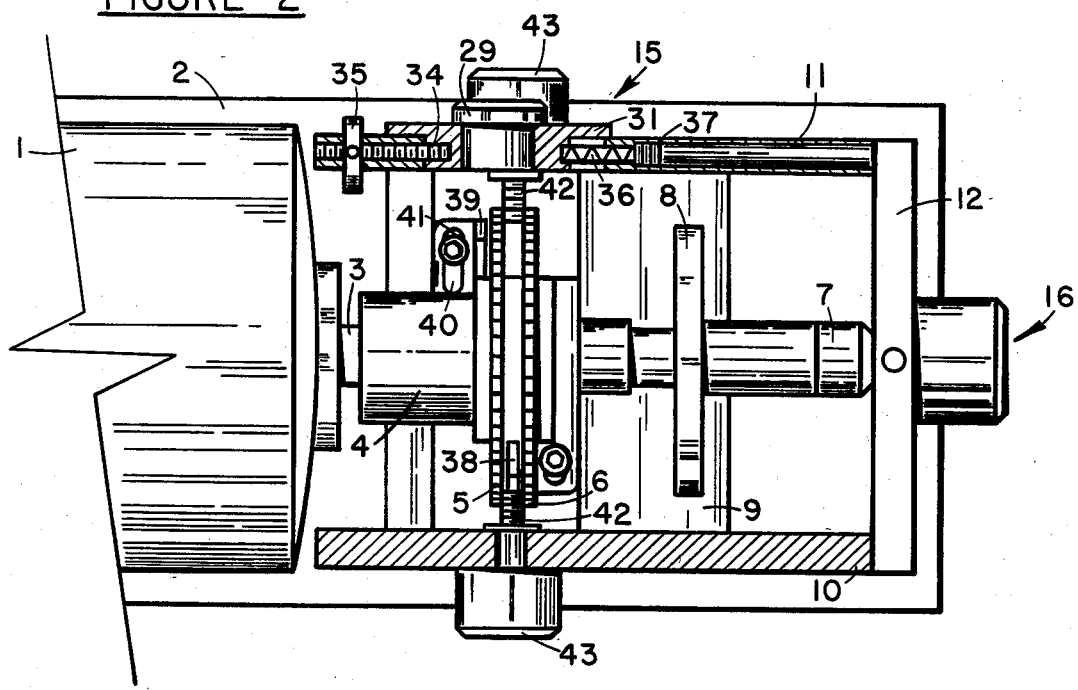
FIG. 2 is a partially sectioned plan view of the device of this invention.
Figure 6:
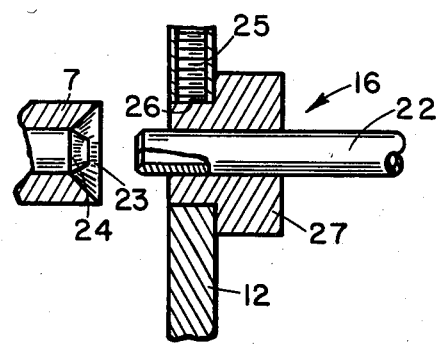
FIG. 6 is a sectioned elevational view of the end guide configuration of this invention.

End guide 16 is here shown to serve the utility of providing an ID or OD chamfer to round or tubular stock. Guide 16 as shown in FIGS. 1, 2, and 6 is positioned to guide a round work piece such as tube 22 into conventional adjustable ID-OD cutter 7. Cutter 7 has an outside cutter 23 for cutting outside chamfers to round stock and inside cutter 24 for providing inside chamfers to tubing stock. ID-OD chamfering tool 7 may be adjusted and sized to cut only ID chamfers, only OD chamfers, or alternatively ID and OD chamfers simultaneously. FIG. 6 serves to illustrate how a set screw 25 in end plate 12 and bearing against a flat 26 on guide bushing 27 serves to secure end guide 16 into plate 12. This and other similar means may be employed to change guide bushings to accommodate to various diameters and shapes of work pieces.

First side guide 14 and second side guide 15 are of similar construction. As shown in FIGS. 1, 2, 4, and 5, guides 14 and 15 are adjustable parallel to the axis of rotation of arbor 4 and are associated with adjustable stops for setting the depth of cut for pieces inserted through guides 14 and 15. Guide bushings 28 and 29 are secured in first slide plate 30 and second slide plate 31 respectively. Slide plates 30 and 31 are provided with slots 32 and locking screws 33. Slide plates 30 and 31 are threadably engaged by adjustment screws 34 which are fixedly attached to adjustment wheel 35. Slide plates 30 and 31 are provided with play spring 36 which is held in place by retainer screw 37.

In use, screws 33 are loosened, wheel 35 is rotated until the guide is in the proper location and screws 33 are tightened. Spring 36 serves to reduce play in the mechanism and thereby assure accuracy of positioning.

Side guides 14 and 15 are also associated with first piece stop 38 and second piece stop 39 respectively. Stops 38 and 39 serve to engage a work piece inserted through the guides and thereby limit the depth of cut on the work piece. Stops 38 and 39 are provided with slots 40 and locking screws 41, adjustment screw 42, and adjustment knob 43. In use locking screws 41 are loosened, knob 43 is rotated until the stop is in the desired location, and locking screws 41 are tightened.

Figure 5:
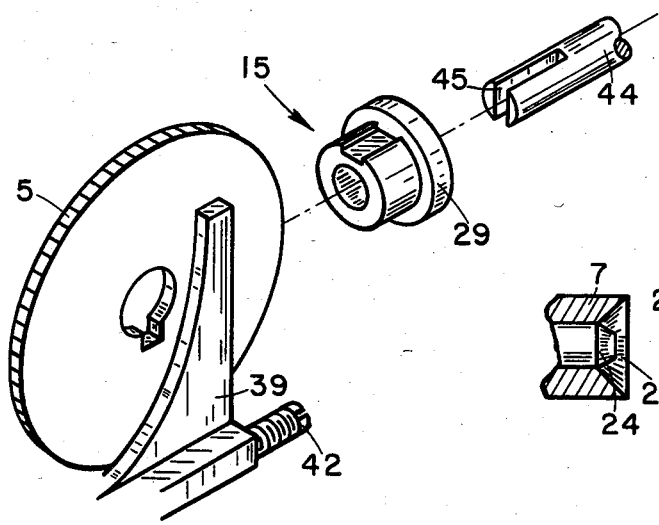
FIG. 5 is a schematic pictorial view of the second side guide configuration of this invention.

Guide 15 is illustrated in FIGS. 2 and 5 as being positioned so that the centerline of the work piece will be guided into the center of cutter 5. This arrangement serves the utility of removing protrusions from the work piece or for slotting as illustrated. In use, guide 15 and stop 39 are first positioned, work piece 44 is inserted through guide bushing 29 and into cutter 5 until work piece 44 engages stop 39 at which time the cutting of slot 45 in work piece 44 is completed.

Figure 4:
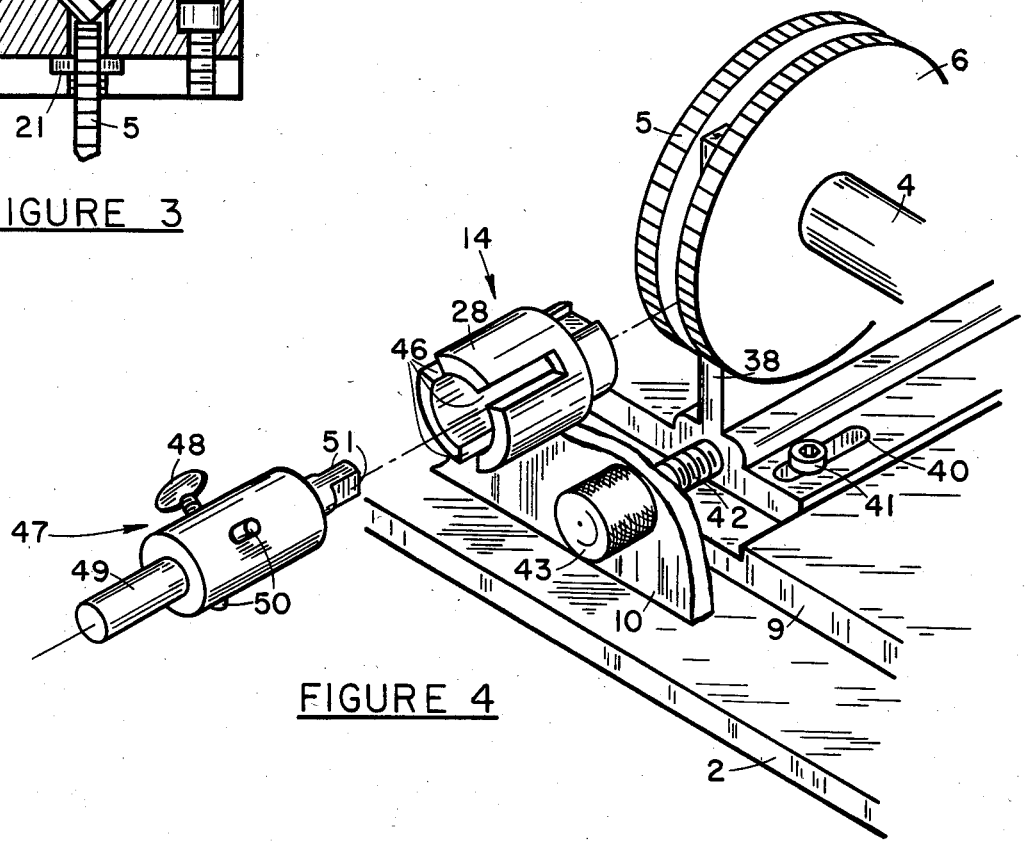
FIG. 4 is a sectioned partially schematic pictorial view of the first side guide configuration of this invention.

First side guide 14 is shown in FIGS. 1, 2, and 4 as being provided with a guide bushing 28 having radial indexing slots 46. Bushing 28 is associated with work piece holder 47. Piece holder 47 is provided with thumb screw 48 which serves to lock work piece 49 in holder 47. Locater pins 50 are positioned on holder 47 so as to act in cooperation with bushing 28 so as to index holder 47 to indexing slots 46 in guide bushing 28.

In use, in the mode illustrated, guide bushing 28 is positioned so as to guide the centerline of work piece 49 midway between cutters 5 and 6. Work piece 49 is secured in holder 47 and holder 47 is indexed to and inserted into guide bushing 28 and work piece 49 is advanced into cutters 5 and 6 until it contacts stop 38 at which time parallel flats have been cut on work piece 50. Holder 47 may then be withdrawn and reindexed 120° until the end of work piece 49 has been fashioned into a hexagonal cross sectional profile.

A preferred embodiment of the invention has been disclosed above. It should be understood, however, that the scope of the invention should not be limited to that of the disclosed embodiments but rather that the scope of the invention should be limited only by the scope of the appended claims and all equivalents thereto which would become apparent to one skilled in the art.

We claim:

1. A portable apparatus for performing secondary and auxiliary machining functions comprising: a motor having a motor shaft and the motor is mounted on a base and an arbor is secured to the motor shaft and a multiplicity of cutting tools is mounted to the arbor and the arbor and cutting tools are covered by a housing and the housing has secured thereto and passing therethrough a multiplicity of guides by means of which a work piece passing through the guides is accurately guided into at least one of the cutting tools, and wherein the housing is rectilinear in shape, having a first side plate having mounted thereto first side guide, a second side plate having mounted thereto a second side guide, an end plate having mounted thereto an end guide, and a top having mounted thereto a top guide.

2. The apparatus of claim 1 wherein the top guide is a V-guide, the end guide is a fixed position guide, and the first side guide and the second side guide are movable guides.

3. The apparatus of claim 2 wherein the arbor has at least one circular milling cutter tool mounted to its midspan and at least one chamfering cutter mounted to the end of the arbor.

4. The apparatus of claim 3 wherein the guides, guide mounting means, and cutting tools may be readily removed and replaced so as to permit accommodation of the apparatus to changes in the sizes and shapes of work pieces and changes in auxiliary machining operations to be performed on the work piece.

* * * * *